(12) United States Patent
Kakutani et al.

(10) Patent No.: US 8,157,659 B2
(45) Date of Patent: Apr. 17, 2012

(54) TELESCOPIC SHAFT AND VEHICLE STEERING APPARATUS

(75) Inventors: Satoshi Kakutani, Kashihara (JP); Hiroyuki Muraosa, Nara (JP)

(73) Assignees: JTEKT Corporation, Osaka (JP); Koyo Machine Industries Co., Ltd., Osaka (JP)

( * ) Notice: Subject to any disclaimer, the term of this patent is extended or adjusted under 35 U.S.C. 154(b) by 920 days.

(21) Appl. No.: 11/991,267

(22) PCT Filed: Sep. 25, 2006

(86) PCT No.: PCT/JP2006/318977
§ 371 (c)(1),
(2), (4) Date: Feb. 29, 2008

(87) PCT Pub. No.: WO2007/040083
PCT Pub. Date: Apr. 12, 2007

(65) Prior Publication Data
US 2009/0280914 A1    Nov. 12, 2009

(30) Foreign Application Priority Data
Sep. 30, 2005   (JP) ................................. 2005-287860

(51) Int. Cl.
*F16D 3/227* (2006.01)
(52) U.S. Cl. ..................................... 464/167
(58) Field of Classification Search .................. 464/167, 464/183; 280/775, 777; 384/49, 51; 285/921; 411/521, 525, 526
See application file for complete search history.

(56) References Cited

U.S. PATENT DOCUMENTS

| | | | |
|---|---|---|---|
| 3,357,755 A | 12/1967 | Danly | |
| 4,003,283 A | 1/1977 | Janiszewski | |
| 4,676,530 A * | 6/1987 | Nordgren et al. | |
| 5,897,281 A * | 4/1999 | Haga et al. | |
| 6,343,993 B1 | 2/2002 | Duval et al. | |
| 6,852,036 B2 * | 2/2005 | Cermak et al. | 464/167 X |
| 7,322,607 B2 * | 1/2008 | Yamada et al. | |
| 7,338,078 B2 * | 3/2008 | Yamada | 280/775 |
| 7,338,382 B2 * | 3/2008 | Yamada | 464/167 |
| 7,404,768 B2 * | 7/2008 | Yamada | 464/167 |
| 7,416,199 B2 * | 8/2008 | Yamada | |
| 7,416,216 B2 * | 8/2008 | Shoda et al. | 280/775 |
| 7,481,130 B2 * | 1/2009 | Yamada et al. | 280/775 X |
| 7,559,267 B2 * | 7/2009 | Yamada | 280/775 X |

(Continued)

FOREIGN PATENT DOCUMENTS
EP       1065397       1/2001
(Continued)

*Primary Examiner* — Gregory Binda
*Assistant Examiner* — Matthieu Setliff
(74) *Attorney, Agent, or Firm* — Rabin & Berdo, PC

(57) ABSTRACT

A telescopic shaft (5) has an inner shaft (12) and a tubular outer shaft (13) that are fitted to each other so as to be relatively movable in an axial direction (X1) and to be able to transmit torque between each other. A row of a plurality of rolling bodies (14) is interposed between corresponding axial grooves (15, 16) of the inner shaft (12) and the outer shaft (13). A retaining member (17) moving together with the rolling bodies (14) while retaining the rolling bodies (14) has a facing portion (33) facing an end surface (121) of the inner shaft (12). As the telescopic shaft (5) telescopes in and out, the facing portion (33) comes into contact with the end surface (121) of the inner shaft (12), and this limits the movement of the rolling bodies (14) in the axial direction (X1).

6 Claims, 5 Drawing Sheets

U.S. PATENT DOCUMENTS

| | | | |
|---|---|---|---|
| 7,717,794 B2 * | 5/2010 | Berger et al. | 464/167 |
| 2004/0245759 A1 * | 12/2004 | Yamada et al. | 280/775 |
| 2005/0104354 A1 * | 5/2005 | Yamada et al. | 280/775 |
| 2005/0257639 A1 * | 11/2005 | Yamada | 464/165 X |
| 2006/0012161 A1 * | 1/2006 | Yamada | 280/777 |
| 2006/0039747 A1 * | 2/2006 | Shoda et al. | 280/777 X |
| 2006/0060022 A1 * | 3/2006 | Yamada | |
| 2006/0068924 A1 * | 3/2006 | Yamada | 464/167 |
| 2006/0082120 A1 * | 4/2006 | Taniguchi et al. | 280/777 |
| 2006/0156855 A1 * | 7/2006 | Yukawa et al. | |
| 2006/0162989 A1 * | 7/2006 | Yamada | 280/775 X |
| 2006/0181069 A1 * | 8/2006 | Yamada | 280/775 |
| 2006/0252559 A1 * | 11/2006 | Yamada | 464/167 |
| 2007/0157754 A1 * | 7/2007 | Yamada | |
| 2007/0273137 A1 * | 11/2007 | Yamada et al. | 280/775 |

FOREIGN PATENT DOCUMENTS

| | | |
|---|---|---|
| EP | 1 553 005 A1 | 7/2005 |
| EP | 1568569 | 8/2005 |
| JP | 6-1839 | 1/1994 |
| JP | 6-39662 | 5/1994 |
| JP | U1839/1994 | 11/1994 |
| JP | 2001-050293 | 2/2001 |
| JP | 2004-106599 | 4/2004 |
| JP | 2004-122938 | 4/2004 |
| JP | 2007-192340 | 8/2004 |
| JP | 2005-324599 | 11/2005 |
| WO | WO-03/031250 | 4/2003 |

* cited by examiner

TELESCOPIC SHAFT AND VEHICLE STEERING APPARATUS

TECHNICAL FIELD

The present invention relates to a telescopic shaft and a vehicle steering apparatus using the same.

BACKGROUND ART

The foregoing telescopic shaft is used, for example, as a steering shaft for a vehicle.

In addition, the telescopic shaft is used as an intermediate shaft for connecting a steering shaft and a steering mechanism such as a rack and pinion mechanism in a motor vehicle. In this case, the telescoping function of the telescopic shaft is utilized for adjusting the length of the intermediate shaft for absorbing relative displacement between a steering gear and a steering column during a drive of the vehicle. Or, the foregoing telescoping function is utilized for adjusting the length of the intermediate shaft for mounting the intermediate shaft in the vehicle.

There has been proposed a telescopic shaft of this kind, in which a plurality of rollable balls are interposed between corresponding axial grooves of an inner shaft and a tubular outer shaft and the both shafts are fit to each other (See, for example, Patent Document 1).

Patent Document 1: Japanese Unexamined Patent Publication No. 2001-50293

DISCLOSURE OF THE INVENTION

Problems to be Solved by the Invention

When the telescopic shaft extends, with the balls rolling inside the axial grooves, the inner shaft and outer shaft move relative to each other in the axial direction. For this reason, stoppers for regulating the movement of the balls in both the extending and contracting directions of the telescopic shaft need to be provided to prevent the rolling balls from dropping off from the axial grooves. For positioning by means of snap rings or the like with such stoppers provided for each shaft or both of the shafts, the structure is bound to be complex and the production cost will be high.

It is an object of the present invention to provide a low-cost telescopic shaft with a simple structure and a vehicle steering apparatus using the same.

Means for Solving the Problems

In order to achieve the foregoing object, a telescopic shaft according to one preferred embodiment of the present invention comprises an inner shaft and a tubular outer shaft that are fitted to each other so as to be relatively movable in an axial direction, at least a pair of axial grooves that are formed in an outer circumference of the inner shaft and in an inner circumference of the outer shaft, respectively, to extend in the axial direction to be opposed to each other, a plurality of rolling bodies forming a row in the axial direction that are interposed between the mutually corresponding axial grooves in the inner shaft and outer shaft and capable of transmitting torque between the inner shaft and the outer shaft, and a retaining member capable of moving together with the plurality of rolling bodies in the axial direction while retaining the rolling bodies. The foregoing retaining member includes a facing portion facing an end surface of the inner shaft. As the telescopic shaft telescopes, the facing portion of the retaining member comes into contact with the end surface of the inner shaft, and this limits the movement of the plurality of rolling bodies in the axial direction.

According to this aspect of the invention, as the telescopic shaft telescopes, the facing portion at the end of the retaining member comes into contact with the end surface of the inner shaft thereby to regulate the movement of the retaining member, by which the movement of the rolling bodies in the axial direction is limited.

Since the end surface of the inner shaft itself functions as a stopper, the structure can be simplified as compared with the conventional case where a stopper for contraction of the telescopic shaft is mounted on the outer circumference of the inner shaft. In addition, the number of assembling processes can be reduced. As a result, the production cost can be reduced.

DESCRIPTION OF THE PREFERRED EMBODIMENTS

Hereinafter, preferred embodiments of the present invention will be described with reference to the accompanying drawings.

Figure 1:
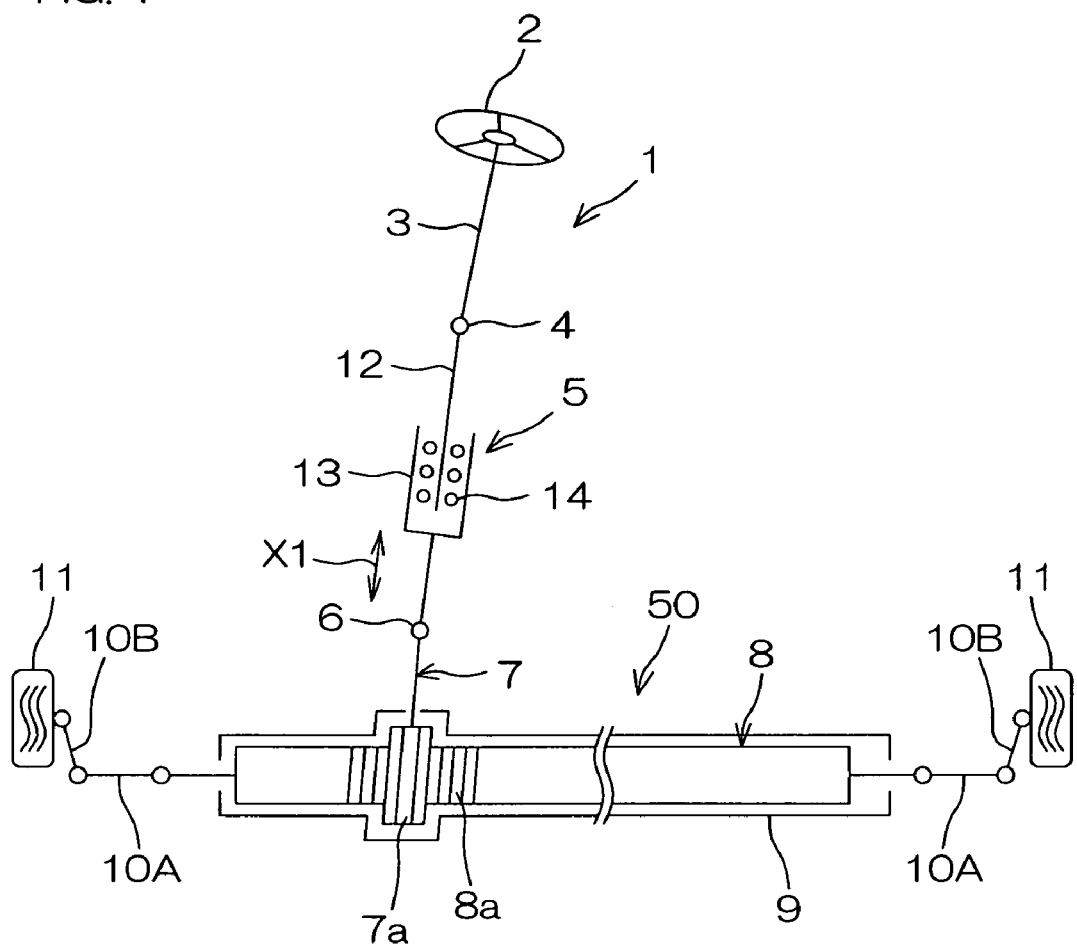
FIG. 1 schematically illustrates the configuration of a vehicle steering apparatus in which a telescopic shaft according to one embodiment of the present invention is applied to an intermediate shaft.

FIG. 1 schematically illustrates the configuration of a vehicle steering apparatus in which a telescopic shaft according to one embodiment of the present invention is applied to an intermediate shaft. A vehicle steering apparatus 1 includes a steering shaft 3 connected to a steering member 2 such as a steering wheel and an intermediate shaft 5 as a telescopic shaft that is connected to the steering shaft 3 through a universal joint 4. In addition, the vehicle steering apparatus 1 includes a pinion shaft 7 connected to the intermediate shaft 5 through a universal joint 6 and a rack bar 8 as steerable shaft having rack teeth 8a in mesh with pinion teeth 7a provided in the vicinity of an end portion of the pinion shaft 7, which extends in a width direction of the vehicle.

The pinion shaft 7 and the rack bar 8 provide a steering mechanism 50 comprising a rack and pinion mechanism.

While a case where a telescopic shaft is applied to the intermediate shaft 5 is described in this embodiment, it is also possible to apply the telescopic shaft of the present invention to the steering shaft 3 so that the steering shaft 3 is provided with a telescopic adjustment function and an impact absorbing function.

The rack bar 8 is linearly reciprocatably held inside a housing 9 fixed to the vehicle body via a plurality of bearings that are not shown. Both end portions of the rack bar 8 project to the both sides of the housing 9, and tie rods 10A are connected to the respective end portions. The tie rods 10A are linked to corresponding steerable wheels 11 through corresponding knuckle arms 10B, respectively.

The intermediate shaft 5 includes an inner shaft 12 as an upper shaft fit into a tubular outer shaft 13 as a lower shaft through balls (rolling bodies) 14 as torque transmitting elements in a slidable manner in an axial direction X1.

Figure 2:
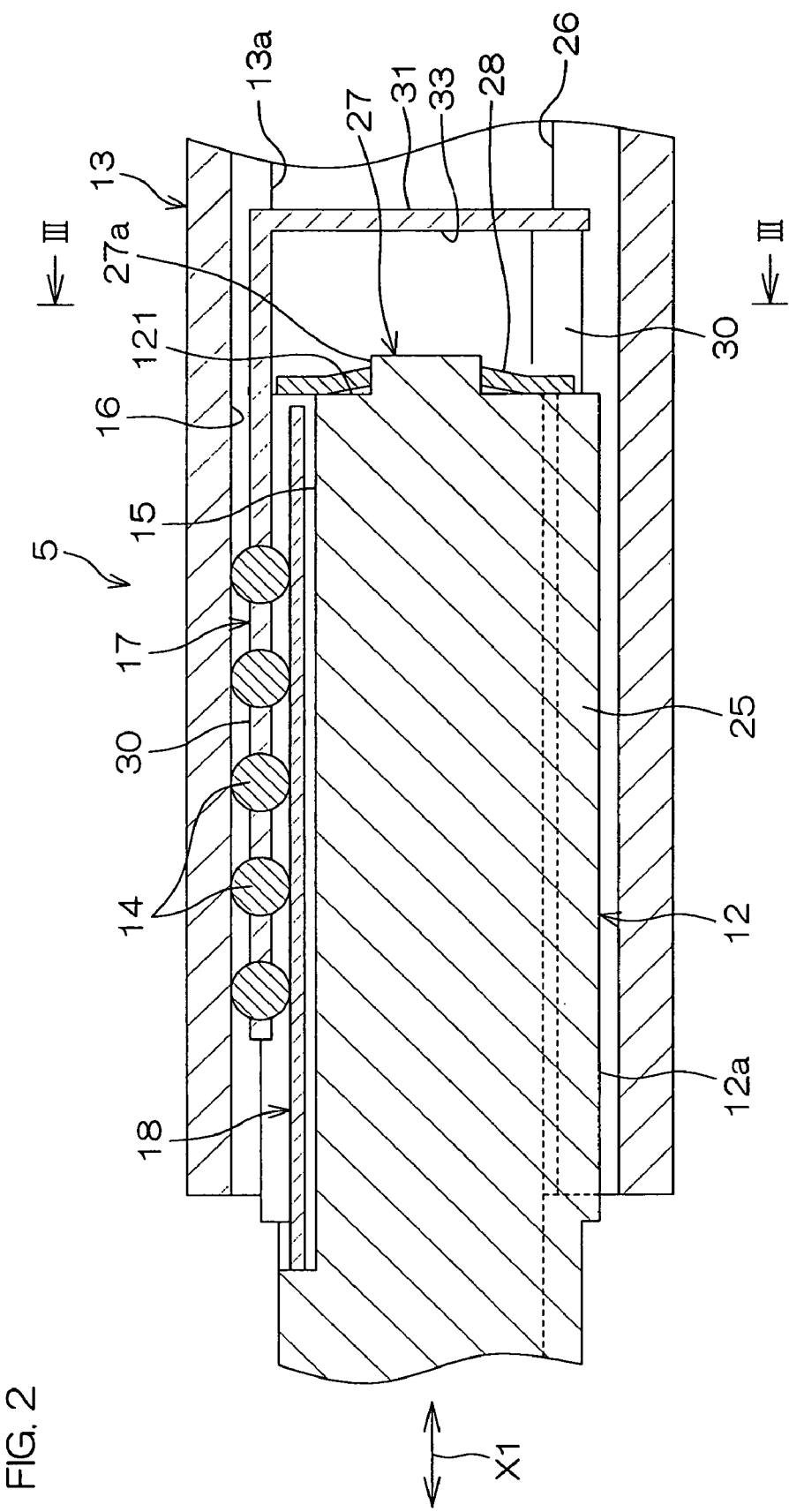
FIG. 2 is a sectional view of the intermediate shaft.
Figure 3:
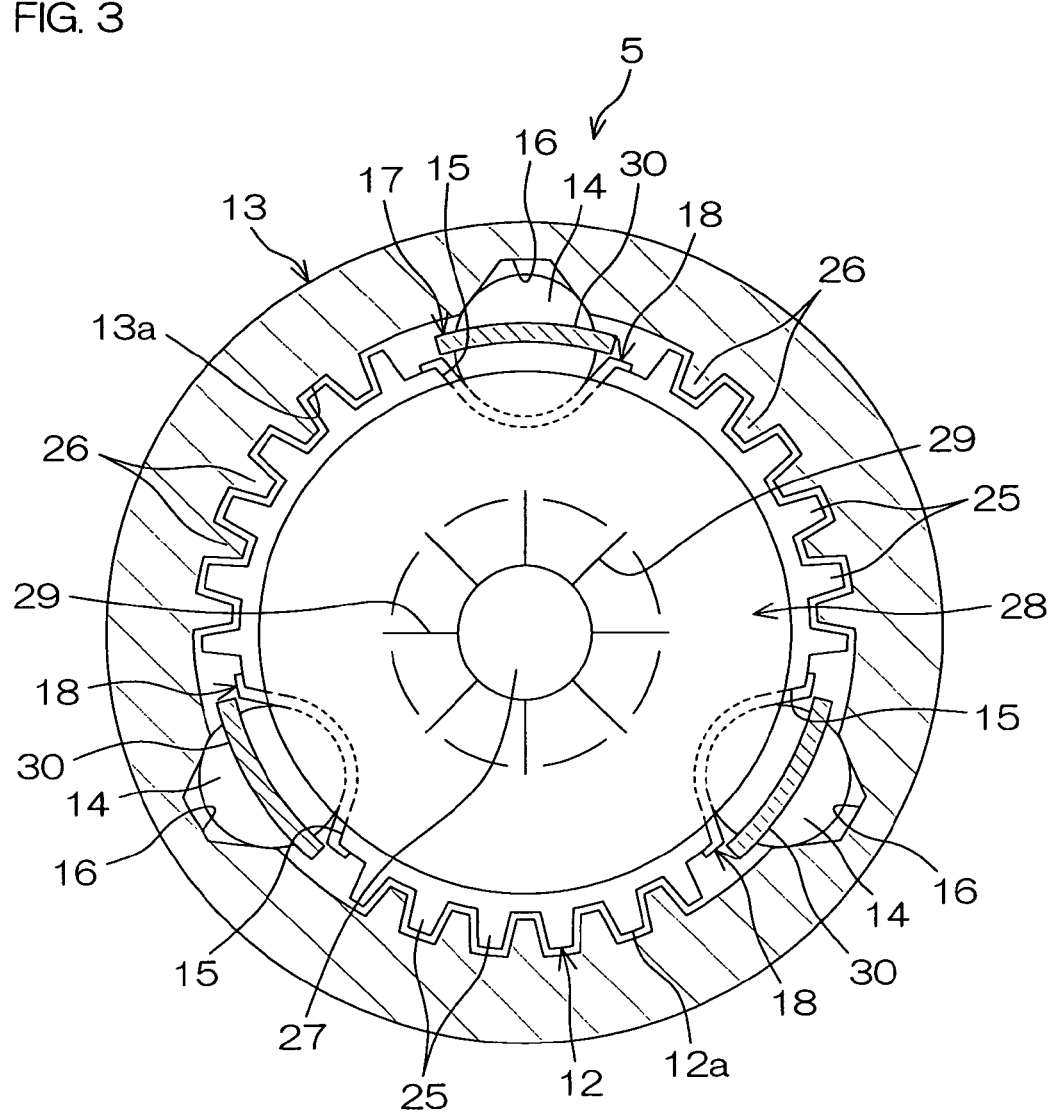
FIG. 3 is a sectional view taken along the line III-III of FIG. 2.

Now, a detailed description will be given of the intermediate shaft 5 referring to FIG. 2 showing a sectional view of the intermediate shaft 5, FIG. 3 showing a sectional view taken along the line III-III of FIG. 2, and FIG. 4 that is a schematically exploded, perspective view of the intermediate shaft 5.

As FIGS. 2 and 3 show, at least a pair of axial grooves 15, 16 are formed in the axial direction X1 on an outer circumference 12a of the inner shaft 12 and on an inner circumference 13a of the outer shaft 13, respectively. In this embodiment, the description is given of a case where three pairs of the axial grooves 15, 16 are formed as in FIG. 3. The axial grooves 15 are arranged along a circumference of the inner shaft 12 at regular intervals, and in the same manner, the axial grooves 16 are arranged along a circumference of the outer shaft 13 at regular intervals.

Each pair of the axial grooves 15, 16 are opposed to each other in radial directions of the both shafts 12, 13, and the balls 14 as the foregoing torque transmitting elements are interposed between the corresponding axial grooves 15, 16 which form a pair. The balls 14 form a row arranged in the axial direction of the both shafts 12, 13, and the row of the balls 14 is retained rollably by retaining members 17 at regular intervals.

Each of the axial grooves 15 of the inner shaft retains a resilient member 18 formed of an elongated thin plate for forming a track of the balls 14. Meanwhile, a track of the balls 14 is formed directly in each of the axial grooves 16 of the outer shaft 13. The foregoing resilient member 18 causes the balls 14 to be biased outward in the radial direction of the inner shaft 12, in other words, toward the side of the axial groove 16 of the outer shaft 13, by which the balls 14 are resiliently sandwiched between the inner shaft 12 and the outer shaft 13.

Figure 4:
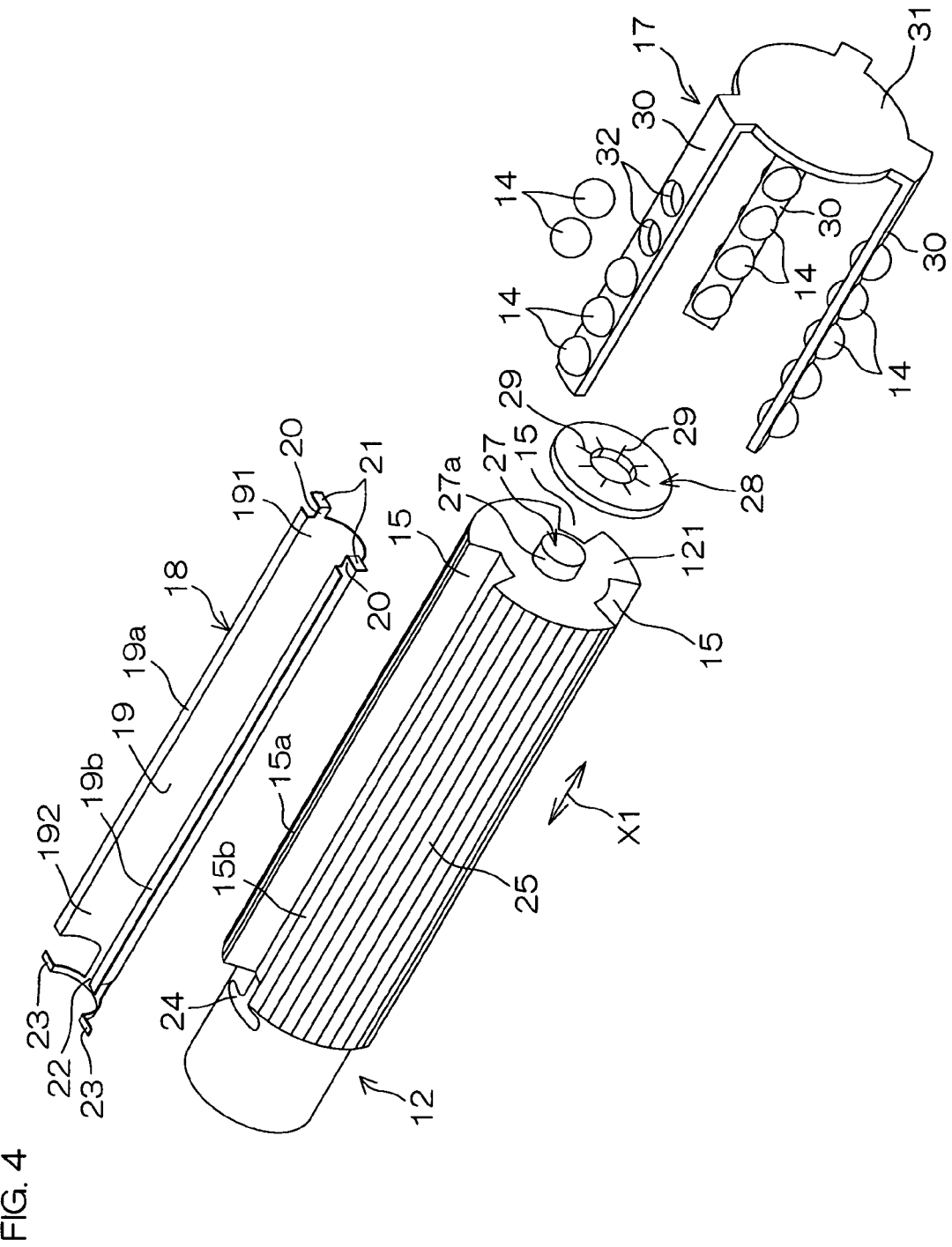
FIG. 4 is a schematically exploded perspective view of the intermediate shaft.

As shown in FIG. 4, the foregoing resilient member 18 includes a main body 19 formed of a gutter-shaped plate that extends a long distance in the axial direction X1 to form the track of the balls 14, a pair of extended portions 20 extended forward from a front end 191 as a first end of the main body 19, and a pair of first engagement projections 21 that are bent from the respective tip ends of the pair of extended portions 20. In addition, the resilient member 18 includes an extended portion 22 extended backward from a rear end 192 as a second end of the body 19, and a pair of second engagement projections 23 branching from the tip end of the extended portion 22 in directions where they are opposed to each other.

The body 19 has a section with an inverted Ω shape and has a pair of flange portions 19a, 19b to be engaged with a pair of edge portions 15a, 15b located at an opening of the axial groove 15, respectively.

The extended portion 22 and the pair of second engagement projections 23 form a T-shape, and these portions are fit into a recessed portion 24 formed in the outer circumference 12a of the inner shaft 12. The pair of first engagement projections 21 are engaged with an end surface 121 of the inner shaft 12. This regulates the movement of the resilient member 18 in the axial direction with respect to the inner shaft 12.

Meanwhile, as shown in FIG. 3, spline teeth 25 are formed on the outer circumference 12a of the inner shaft 12 between axial grooves 15, 15 that are adjacent to each other circumferentially about the inner shaft 12. Spline teeth 26 are formed on the inner circumference 13a of the outer shaft 13 between axial grooves 16, 16 that are adjacent to each other circumferentially about the outer shaft 13. By both of the spline teeth 25, 26, a stiffness connection element is provided which is capable of stiffly connecting the inner shaft 12 and the outer shaft 13 upon application of a great transmitting torque.

In this intermediate shaft 5, when no transmitting torque or a transmitting torque less than a predetermined value is applied between the inner shaft 12 and the outer shaft 13, the inner shaft 12 and the outer shaft 13 are resiliently connected to each other circumferentially through the balls 14 biased by the resilient member 18. At this time, both of the spline teeth 25, 26 as stiffness connection elements do not connect the inner shaft 12 and the outer shaft 13 circumferentially, and as a result, resistance to relative axial movement between the inner shaft 12 and the outer shaft 13 is lessened. In addition, torque is transmitted between the both shafts 12, 13 only through resiliency connection elements including the balls 14 and the resilient member 18.

On the other hand, when torque transmitted between the inner shaft 12 and the outer shaft 13 exceeds a predetermined value, the inner shaft 12 and the outer shaft 13 rotate relative to each other by a small amount accompanied by flection of the resilient member 18, by which the spline teeth 25 of the inner shaft 12 and the spline teeth 26 of the outer shaft 13 are engaged with each other. As a result, the inner shaft 12 and the outer shaft 13 are stiffly connected to each other with respect to circumferences thereof. At this time, the resiliency connection elements including the balls 14 and the resilient member 18 also transmit torque between the both shafts 12, 13.

Referring to FIGS. 2 and 4, an axially projecting convex 27 with a small diameter is formed on the end surface 121 of the inner shaft 12. A push nut 28 is fit to a circumference 27a of the convex 27, so that the push nut 28 is retained to be movable together with the inner shaft 12 in the axial direction X1.

The push nut 28 includes an annular plate whose inner circumference has, for example, a plurality of radial cuttings 29 to make it harder to disengage. The push nut 28 functions as an intermediate shaft extension stopper that limits the axial movement of balls 14 in each row accompanying with extension of the intermediate shaft 5, and prevents the balls 14 from dropping off from the axial groove 15 of the inner shaft 12 upon extension of the intermediate shaft 5. Specifically, the push nut 28 comes in contact with a ball 14 located at the end of the row thereby to limit the axial movement of the balls 14.

Referring to FIGS. 2 and 4, the retaining member 17 includes a plurality of elongated retaining parts 30 extending in the axial direction and a connection part 31 that interconnects end portions of the respective retaining parts 30. Each of the retaining parts 30 is disposed at the location between the corresponding pair of axial grooves 15, 16. Each of the retaining parts 30 is formed with retaining holes 32 for retaining the balls 14 to be rollable between the corresponding pair of axial grooves 15, 16, which are disposed in the longitudinal direction of the retaining part 30 at certain intervals.

Figure 5:
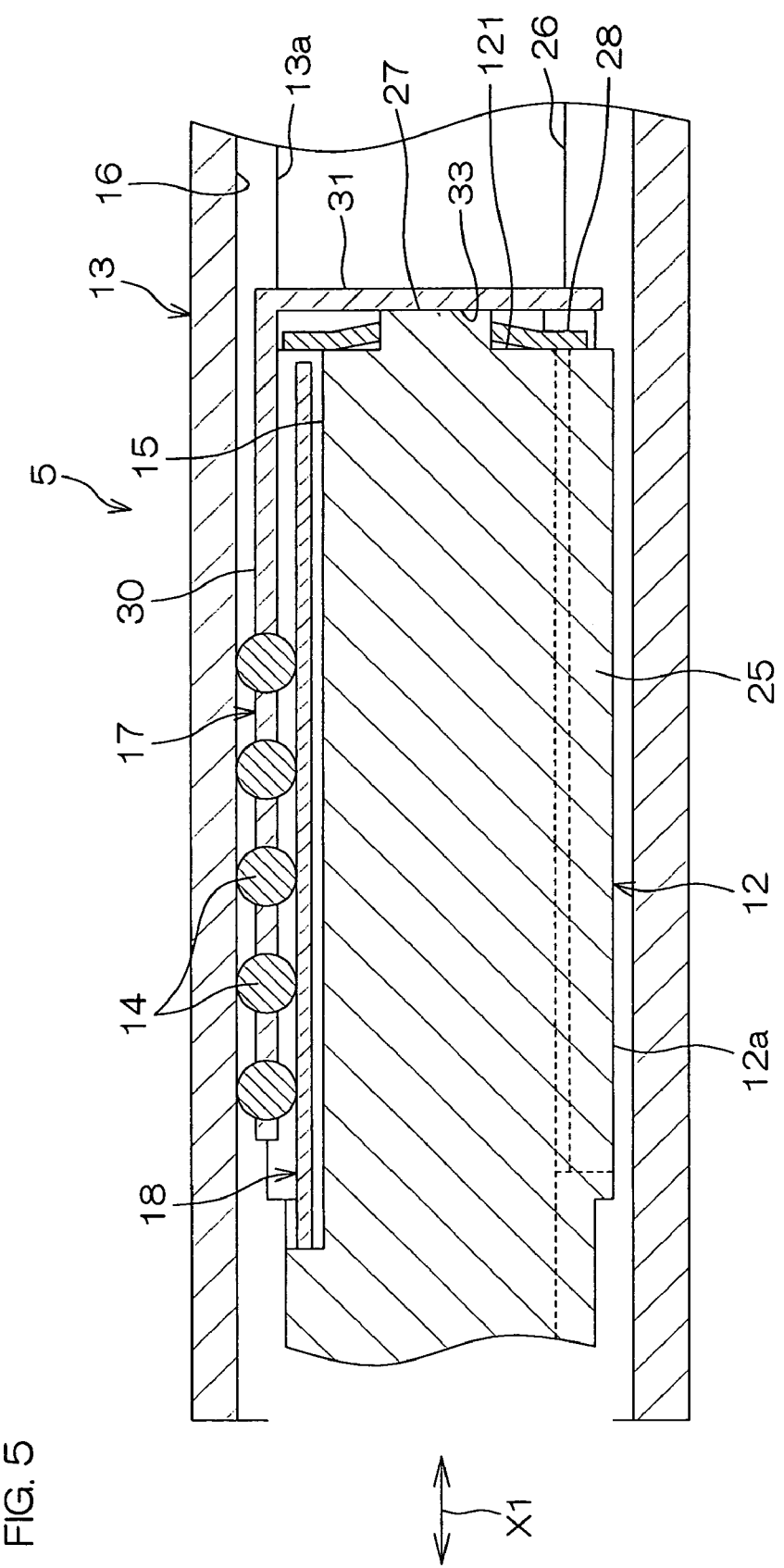
FIG. 5 is a sectional view of the intermediate shaft in the most contracted state.

As an example of the connection part 31, a disc, an annular plate or the like may be recited. However, the configuration thereof may be of any kind as long as it is capable of interconnecting the end portions of the plurality of retaining parts 30. As shown in FIG. 2, the connection part 31 has a facing portion 33 that faces the end surface 121 of the inner shaft 12. As the intermediate shaft 5 telescopes, the facing portion 33 comes in contact with the convex 27 that is the most projecting part of the end surface 121 of the inner shaft 12 as shown in FIG. 5 thereby to limit the axial movement of the retaining member 17. The facing portion 33 of the retaining member 17 thus functions as the intermediate shaft contraction stopper for limiting the axial movement of the row of the balls 14. As a result, the balls 14 are prevented from dropping off from the axial grooves 16 of the outer shaft 13 upon contraction of the intermediate shaft 5.

As described so far, according to the present embodiment, the axial movement of the balls 14 can be limited by the facing portion 33 of the retaining member 17 that comes in contact with the end surface 121 (specifically, the convex 27 of the end surface 121) of the inner shaft 12 when the intermediate shaft 5 as the telescopic shaft telescopes. Since the end surface 121 of the inner shaft 12 itself is utilized as the stopper, the structure can be simplified and the number of assembling processes can be reduced as compared with the conventional case where a contraction stopper is fixed to the outer circumference of the inner shaft. As a result, the production cost can be reduced.

Moreover, since the retaining member 17 is constituted as an integral unit including the plurality of retaining parts 30 each disposed between each pair of the axial grooves 15, 16 and the connection part 31 that interconnects the end portions of the retaining parts 30, the number of components can be further reduced, and also assembly of the intermediate shaft 5 can be facilitated.

Furthermore, because of the arrangement where the push nut 28 locked to the convex 27 of the end surface 121 of the inner shaft 12 limits the axial movement of the balls 14 upon extension of the telescopic shaft 1, the following advantages are obtained: since only press fitting a general-purpose push nut 28 onto the convex 27 of the end surface 121 of the inner shaft 12 is needed, the number of assembling processes can be reduced as well as the structure of the stopper mechanism at the time of extension can be simplified.

The present invention is not limited to the foregoing embodiment, and for example, the telescopic shaft of the present invention is applicable to the steering shaft 3. In that case, it will be advantageous that the steering shaft 3 is adapted to have a telescopic adjustment function and an impact absorbing function.

In addition, while in the foregoing embodiment, the balls 14 are biased by means of the resilient member 18 disposed in the axial groove 15 of the inner shaft 12, it is also possible to spare the resilient member 18 and utilize resiliency of the tubular outer shaft 13 itself to bias the balls 14.

The present invention has been heretofore described by way of the specific embodiments. However, those skilled in the art will readily devise modifications, alterations and equivalents thereof. Thus, the scope of the present invention should be determined by the appended claims and their equivalents.

The present application corresponds to Japanese patent application No. 2005-287860 filed on Sep. 30, 2005 with the Japanese Patent Office, the entire disclosure of which is hereby incorporated by reference.

The invention claimed is:
1. A telescopic shaft comprising:
an inner shaft and a tubular outer shaft that are fitted to each other so as to be relatively movable in an axial direction;
at least a pair of axial grooves that are formed in an outer circumference of the inner shaft and in an inner circumference of the outer shaft, respectively, to extend in the axial direction to be opposed to each other;
a plurality of rolling elements forming a row in the axial direction that are interposed between the corresponding pair of axial grooves in the inner shaft and the outer shaft and capable of transmitting torque between the inner shaft and the outer shaft; and
a retaining member capable of moving together with the plurality of rolling elements in the axial direction while retaining the rolling elements;
the retaining member including a facing portion facing an end surface of the inner shaft, and
the facing portion of the retaining member coming into contact with the end surface of the inner shaft, as the telescopic shaft telescopes, to thereby limit movement of the plurality of rolling elements in the axial direction;
a convex projecting in the axial direction that is provided in the end surface of the inner shaft, the facing portion of the retaining member coming in contact with a summit portion of the convex in the end surface of the inner shaft and thereby limiting the movement of the plurality of rolling elements in the axial direction; and
a push nut locked to the convex, the push nut coming in contact with a rolling element located at an end of the row, as the telescopic shaft extends, thereby limiting the movement of the retaining member in the axial direction, by which the movement of the plurality of rolling elements in the axial direction is limited; and
the push nut including an annular plate whose inner circumference has a plurality of radial cuttings, the annular plate including a radially inner portion and a radially outer portion,
the radially inner portion being locked on an outer periphery of the convex,
the radially inner portion being deformed by bending so as to protrude in a direction in which the rolling elements drop off from the axial groove of the inner shaft,
the radially outer portion being in contact with the end surface of the inner shaft,
a part of the radially outer portion facing the axial groove of the inner shaft, and
the part of the radially outer portion being configured to prevent the rolling elements from dropping off from the axial groove of the inner shaft.

2. The telescopic shaft according to claim 1, wherein a plurality of pairs of axial grooves are provided, and the plurality of rolling elements forming a row are interposed between each of the pairs of the axial grooves,
the retaining member includes a plurality of retaining parts extending in parallel to the axial direction and retaining the rolling elements between the respective pairs of axial grooves and a connection part for interconnecting end portions of the plurality of retaining parts, and
the connection part is provided with the facing portion.

3. The telescopic shaft according to claim 2, wherein the retaining parts and the connection part of the retaining member are formed integrally of a single material.

4. A vehicle steering apparatus which transmits steering torque of a steering member using the telescopic shaft as claimed in claim 3.

5. A vehicle steering apparatus which transmits steering torque of a steering member using the telescopic shaft as claimed in claim 2.

6. A vehicle steering apparatus which transmits steering torque of a steering member using the telescopic shaft as claimed in claim 1.

* * * * *